(12) United States Patent
Yang et al.

(10) Patent No.: US 7,508,848 B2
(45) Date of Patent: Mar. 24, 2009

(54) METHOD AND CONFIGURATIONS IN ACHIEVING HIGH ENERGY OPERATION FOR PHOTONIC BAND GAP (PGB) FIBER WITH END CAPS

(75) Inventors: Lih-Mei Yang, Palo Alto, CA (US); Jian Liu, Sunnyvale, CA (US)

(73) Assignee: Polaronyx, Sunnyvale, CA (US)

( * ) Notice: Subject to any disclaimer, the term of this patent is extended or adjusted under 35 U.S.C. 154(b) by 314 days.

(21) Appl. No.: 11/482,844

(22) Filed: Jul. 7, 2006

(65) Prior Publication Data
US 2007/0008994 A1    Jan. 11, 2007

Related U.S. Application Data

(60) Provisional application No. 60/696,210, filed on Jul. 7, 2005, provisional application No. 60/698,209, filed on Jul. 7, 2005.

(51) Int. Cl.
*H01S 3/30* (2006.01)
(52) U.S. Cl. .............................. 372/6; 385/58; 385/73; 385/95; 385/96; 385/125
(58) Field of Classification Search .................. 372/6; 385/58, 73, 95, 96, 125
See application file for complete search history.

(56) References Cited

U.S. PATENT DOCUMENTS

| | | | |
|---|---|---|---|
| 2003/0068150 A1* | 4/2003 | Ariel et al. | 385/125 |
| 2006/0067632 A1* | 3/2006 | Broeng et al. | 385/96 |
| 2006/0120418 A1* | 6/2006 | Harter et al. | 372/30 |

OTHER PUBLICATIONS

J.D. Shephard et al "High Energy nanosecond laser pulses delivered single-mode through hollow-core PBG fibers", Optics Express vol. 12, No. 4, Feb. 23, 2004.*

* cited by examiner

*Primary Examiner*—Minsun Harvey
*Assistant Examiner*—Yuanda Zhang
(74) *Attorney, Agent, or Firm*—Xin Wen

(57) ABSTRACT

A fiber Chirped Pulse Amplification (CPA) laser system includes a photonics band gap (PBG) fiber to function as a compressor. The PBG fiber is spliced with a fiber end cap that has an core expander for increasing a mode area of the PBG fiber. With increased mode area, the laser system is enabled to sustain an increased damage threshold energy thus is capable of producing short pulse laser with higher pulse energy.

31 Claims, 5 Drawing Sheets

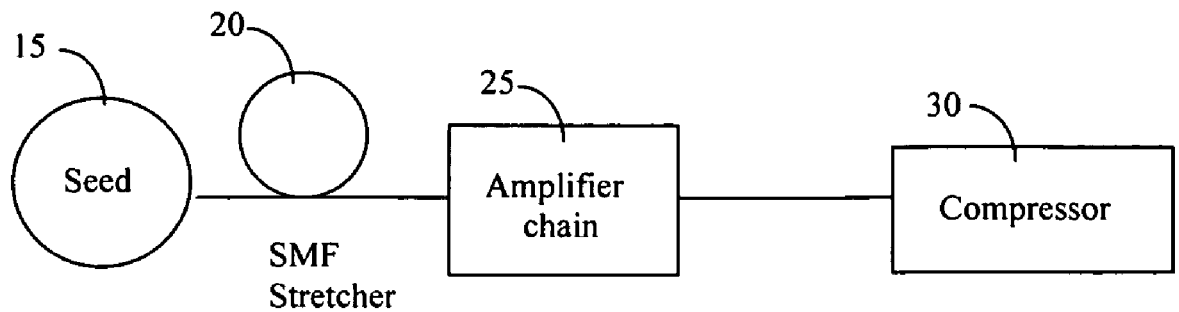
Fig. 1 functional block diagram of a Fiber Laser System
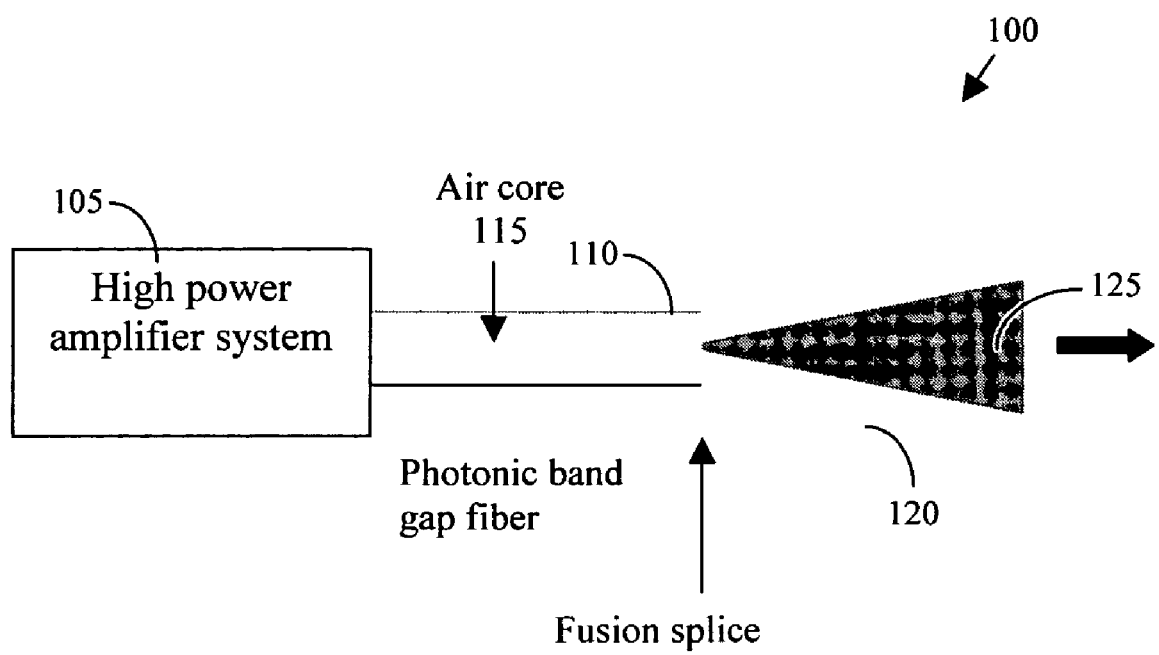
Figure 2A

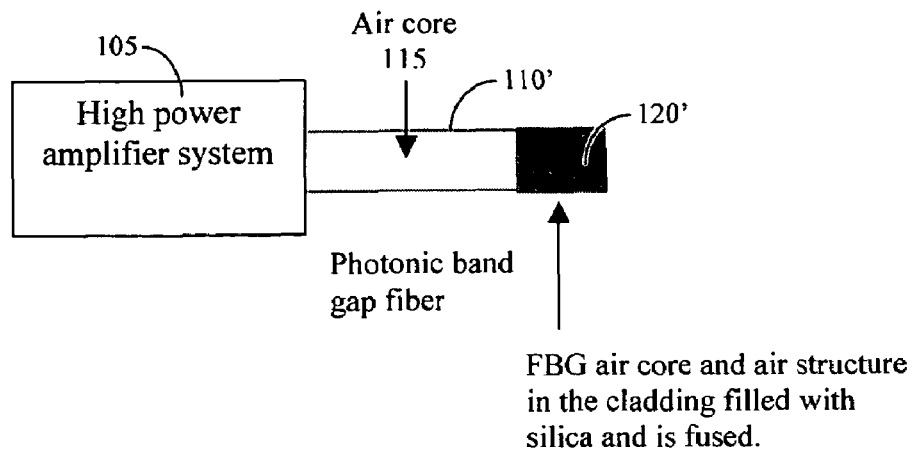
Figure 2B
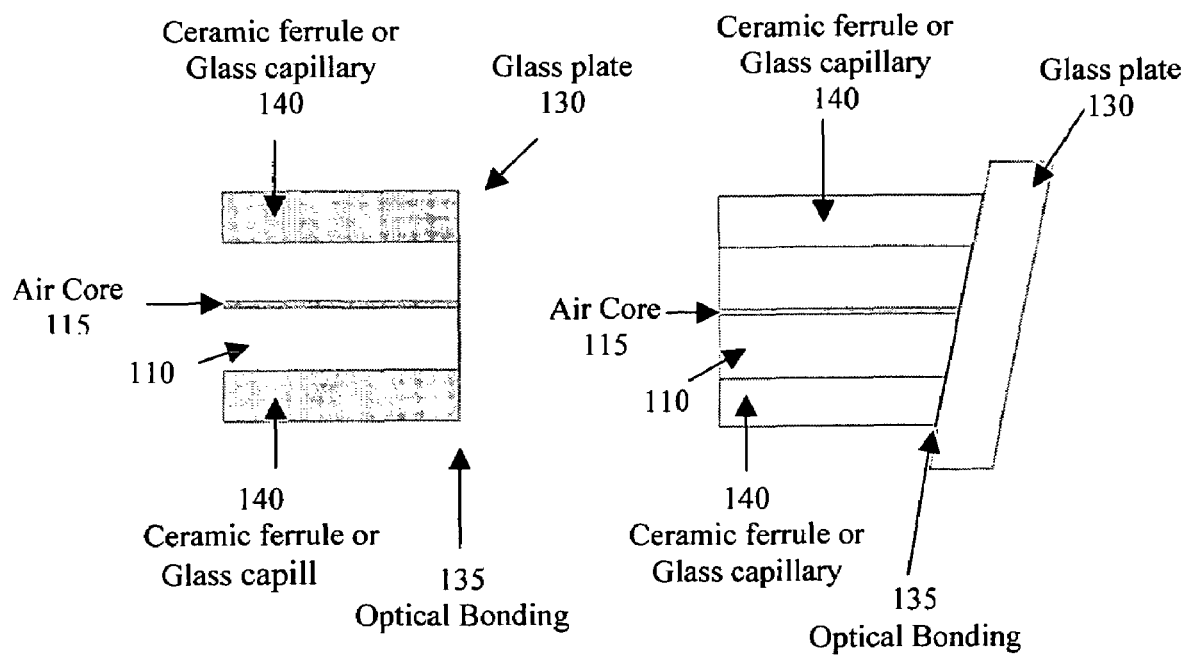
Figure 3A
Figure 3B

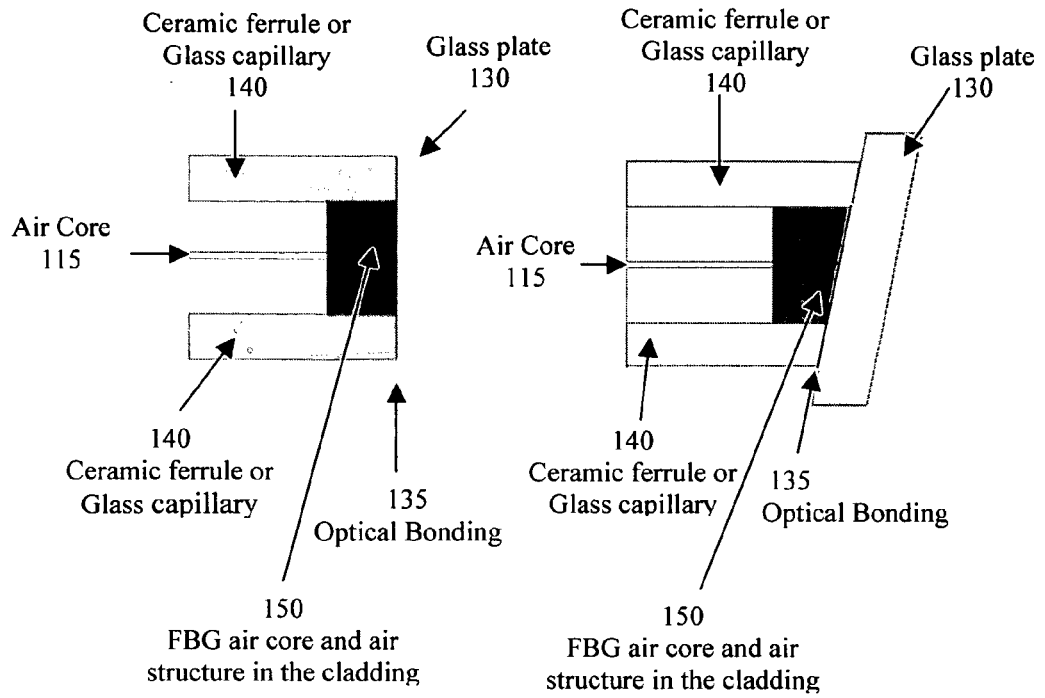
Figure 3C
Figure 3D
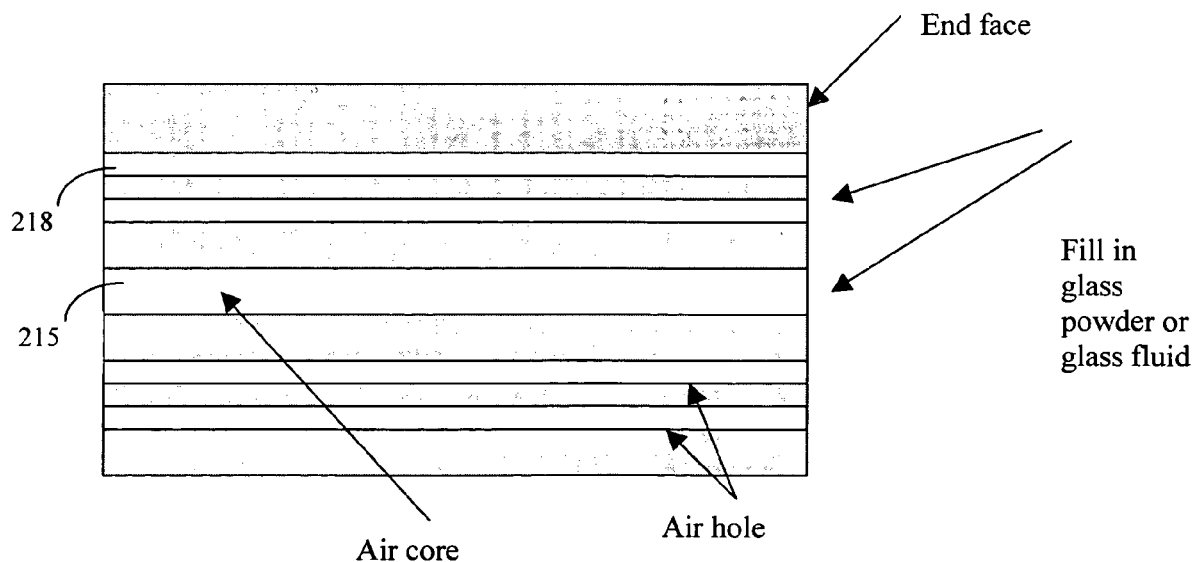
Figure 4A

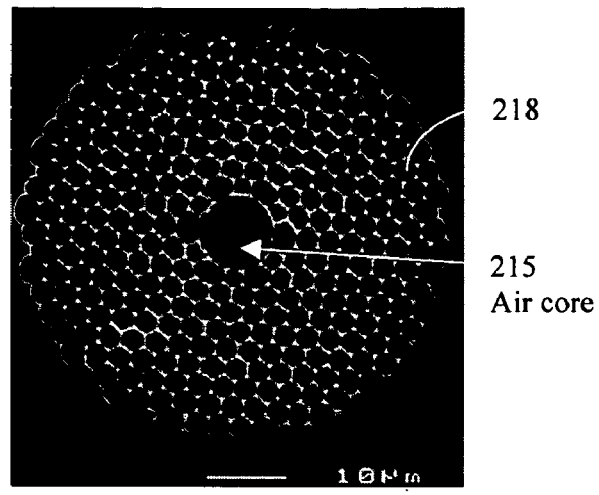
Figure 4B An example for air core photonics band gap fiber
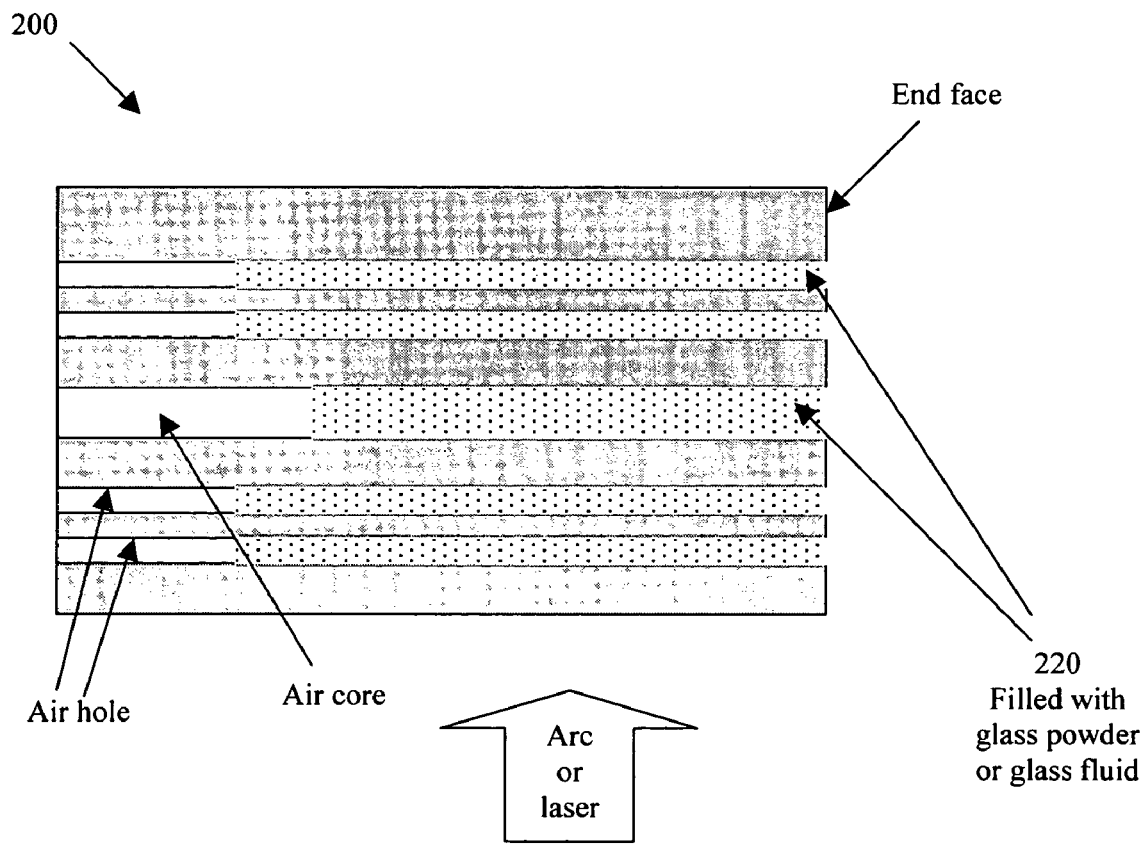
Figure 4C

METHOD AND CONFIGURATIONS IN ACHIEVING HIGH ENERGY OPERATION FOR PHOTONIC BAND GAP (PGB) FIBER WITH END CAPS

This Formal Application claims a Priority Date of Jul. 7, 2005 benefit from two Provisional Patent Application 60/698,209 and Jul. 7, 2005 benefit from another Provisional Patent Application 60/696,210 filed by one of a common Inventors of this Application. The disclosures made in 60/698,209 and 60/698,210 are hereby incorporated by reference in this Patent Application.

FIELD OF THE INVENTION

The present invention relates generally to apparatuses and methods for providing pulsed fiber laser systems. More particularly, this invention relates to method for achieving high-energy operation for photonic band-gap fiber and a novel end cap for the photonic band-gap (PBG) fiber.

BACKGROUND OF THE INVENTION

Even though current technologies of fiber laser have made significant progress toward achieving a compact and reliable fiber laser system providing high quality output laser with ever increasing output energy, however there are still technical difficulties in implementing an air core photonics band gap fiber (PBF) in a fiber compressor. For better understanding the function performed by a pulse compressor, a short pulse high energy fiber laser system as that shown in FIG. 1 is first described. Referring to FIG. 1 for a schematic diagram of a short pulse high-energy fiber laser system that includes a laser seed 15 having an oscillator for generating a fiber-based mode-locking laser with original pulse duration. The laser project from the oscillator of the seed laser 15 is projected into a single mode fiber (SMF) laser stretcher 20 to stretch the laser pulse. The stretcher 20 generates laser pulse with stretched pulse width is projected into a series of laser amplifiers 25 to amplify the laser into higher energy. The amplified laser is then projected into a pulse compressor 30 to re-compress the pulse width of the laser to output a laser with original pulse width. In order to provide compact and reliable fiber laser system, instead using grating lenses for pulse compression as that commonly used in a conventional system, it is desirable and very promising according to test results to implement a compressor with the air core photonics band gap (PBG) fiber. Specifically, the air core PBG fiber is very useful for high-energy fiber laser/amplifier for compressing the chirped pulses back to a couple of hundreds fs. Even though such configuration enables an all fiber system for generating short pulse-high energy lasers, however, due to a limitation in power handling of the end-face of the photonics band gap (PBG) fiber, the outputted laser is still limited to only tens of micro Joules. Laser output of higher energy is not yet feasible due to this limitation when a laser system is implemented with the PBG fiber In order to further improve the energy handling, different configurations or processes may be implemented to prevent a surface damage of the end-faces of the PBG fiber. End cap of a piece of coreless fiber or glass can be attached to the PBG fiber to increase the mode area of output beam at the end facet. This will make possible to amplify ps to 100 fs pulse to the level of mJ. However, perfect treatment of the two surfaces of two separated pieces of material (PBG fiber with coreless fiber or glass plate) is difficult.

Therefore, a need still exists in the art of fiber laser design and manufacture to provide a new and improved configuration and method to provide fiber laser with new PBG fiber covered with end caps or with part of the air core and air holes filled with glass powder or liquid glass. The new and novel FBG fiber of this invention increases the mode area of the fiber to improve the energy absorptions and dissipation processes in laser transmission. With the improved FBG fiber to function as a compressor of the laser system, a short pulse high-energy laser system is enabled to provide laser output power up to millie-Joules (mJ) having ps to 100 fs pulse widths.

SUMMARY OF THE PRESENT INVENTION

It is therefore an aspect of the present invention to provide a photonics band gap (PBG) fiber function as a compressor that is spliced with a end cap having an core expander to function as a silica fiber without core thus increasing the mode area with greater energy absorption capacity and higher energy dissipation rate thus improving the output power laser power for a short pulse high-energy laser system.

It is another aspect of this invention to provide a photonics band gap (PBG) fiber function as a compressor that is surrounded by a ceramic ferrule or glass capillary attached to a glass plate at the end surface by an optical boding to function as an end cap thus increasing the mode area with greater energy absorption capacity and higher energy dissipation rate thus improving the output power laser power for a short pulse high-energy laser system.

It is another aspect of this invention to provide a photonics band gap (PBG) fiber function as a compressor with the air core and the air holes filled with glass powder or liquid glass. The partially filled FBG fiber is implemented as a compressor with increased mode area with greater energy absorption capacity and higher energy dissipation rate thus improving the output laser power for a short pulse high-energy laser system.

It is a further aspect of this invention to provide special configuration by implementing different types of end caps at the end surface of a compressor for the purpose of increasing the mode area for increasing the laser energy absorption capacity and energy dissipation rate thus improving the output laser power of a short pulse high-energy laser system. With improved compressor capable of handling higher power transmission, the above discussed problems and limitations of the prior art are resolved.

Briefly, in a preferred embodiment, the present invention discloses a fiber Chirped Pulse Amplification (CPA) laser system includes a photonics band gap (PBG) fiber to function as a compressor. The PBG fiber is spliced with a fiber end cap that has an core expander for increasing a mode area of the PBG fiber. With increased mode area, the laser system is enabled to sustain an increased damage threshold energy thus is capable of producing short pulse laser with higher pulse energy.

In a preferred embodiment, this invention further discloses a method for increasing a mode area of a photonics band gap (PBG) fiber functioning as a pulse width compressor. The method includes a step of implementing an end cap at the end surface of the PBG fiber thus allow the PBG to absorb greater amount of energy with an increased rate of heat dissipation. With the increased mode area, the PBG fiber can sustain higher threshold damage energy to produce ultra-short laser pulse with higher pulse energy.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 is a functional block diagram for showing a fiber laser system implemented with a compressor having a high energy end cap of this invention.

FIGS. 2A to 2B are cross section views of part of the laser system implemented with PBG fiber fusion spliced to an end cap with a core expander of this invention.

FIGS. 3A to 3D are cross sectional views of a FGB fiber supports a ceramic ferrule or glass capillary attached to an glass plate as an end surface by an optical bonding to prevent high energy damage to the PBG fiber.

FIGS. 4A and 4B are side cross sectional view and a cross sectional view of a FBG fiber implemented as a compressor for a laser system of FIG. 1.

FIGS. 4C and 4D are cross sectional views for illustrating a new FBG fiber with end portions of the air core and air holes surrounding the air core be filled with glass powder of liquid glass to function as a high energy FBG fiber.

DETAILED DESCRIPTION OF THE INVENTION

Figure 4D:
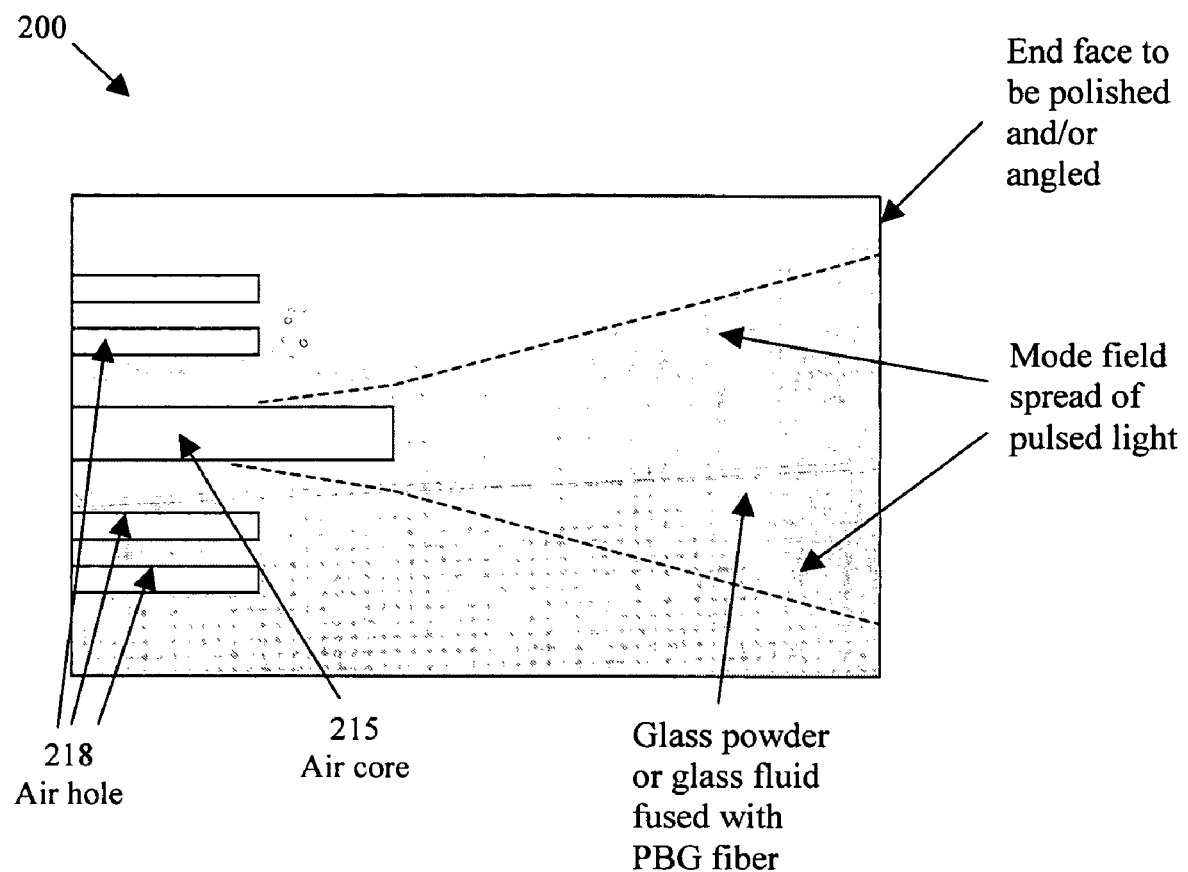

Referring to FIG. 2A for a cross sectional view of a compressor 100 of this invention. The compressor 100 receives amplified laser from a high power laser amplifier system 105 through a photonics band gap (PBG) fiber 110. The compressor further includes a fiber end cap 120 that includes a fiber core expander 125. The fiber end cap 120 can be implemented as a silica fiber without core that is fusion spliced with the PBG fiber 110. A fusion technology is used to integrate the fiber end cap 120 to the FBG fiber 110. Referring to FIG. 2A again, the fiber end cap is a silica fiber without core to extend the beam mode field diameter from fibers. The fiber end cap/fiber includes a core expander 125 that has a diameter gradually expanded based on the expanded mode field diameter to avoid the damage on the fiber. The fiber end cap/fiber core expander 125 has a length that could be reduced after the fusion splice. FIG. 2A presents the schematic diagram of fiber end cap 120 spliced with photonic band gap fiber 110 for all fiber based amplification at 1 um. The photonic band gap fiber 110 can provide large anomalous dispersion at 1 um (120 ps/nm/km, for example, from Crystal-Fibre, Denmark, part #HC-1060-02). The FBG fiber 110 can compensate the fiber dispersion along the fiber amplifiers and improve the damage threshold than silicate core fiber (for example, Photonic Crystal fiber, from Crystal-Fibre, Denmark). The fiber end cap 120 is spliced with air PBG 110 and the fusion splice can induce the air core and cladding air structure collapse with silica structure to produce mode field match with fiber end cap. Alternately, as shown in FIG. 2B, the FBG 110' can be filled with silica 120' on both air core and air structure on the cladding, and can be fused to increase the mode area as shown in the end segment 120' of FIG. 2B.

The fiber end cap/fiber core expander as shown in FIGS. 2A and 2B, increases the mode field diameter and the damage threshold of high power/pulse energy in fiber based amplifier system. The end cap avoids the damages in the fiber end facets after short pulse high energy.

Referring to FIGS. 3A to 3C for alternate configurations and methods of using a glass plate 130 as an end cap that is bonded to a ceramic ferrule or glass capillary 140 by an optical bonding 135. The ceramic ferrule or glass capillary 140 surrounds the FBG fiber 110 that has an air core and the FBG fiber functions as a compressor. The glass plate 130 as an end cap can be polished either flat as that shown in FIG. 3A or with an tilt angle as that shown in FIG. 3B. The end face of the ceramic ferrule or glass capillary 140 attaches to the glass plate 130, for example, fused silica, with epoxy-free optical bonding technique, for example, by using a Chemically Activated Direct Bonding from Precisionphotonics, CO. This bonding can result 100% optically transparent with negligible scattering and loss at the interface. The damage threshold is as good as coating and is 5~10 J/cm^2.

Referring to FIGS. 3C and 3D for similar end cap configurations as that of FIGS. 3A and 3B respectively. The only difference from the end caps of FIGS. 3A and 3B is that the end of PBG fiber 110 is filled with silica 150 in both core 115 and cladding 118 to increase the end bonding surface with glass plate 130 and increase the mode field diameter at the end section of PBG fiber 110. The end cap attaches to PBG fiber 110 increases the mode field area of the output beam at the end facet of all fiber based short pulse amplification system. This can result ultra-short (for example, 100 fs) pulse and high pulse energy, for example, mJ.

Referring to FIGS. 4A and 4B for an FBG fiber that includes an air core 215 surrounded by a micro-structured cladding 218 formed by a periodic arrangement of air holes in silica. FIG. 4C shows an alternate configuration of a FBG fiber 200 functions as a compressor that is fabricated by a step of using glass powder or glass fluid 220 to fill in the air core 215 and the surrounding air holes 218 of a photonic band gap (PBG) fiber shown in FIG. 4C. The fill in speed and volume has to be controlled to make the glass power or glass fluid smoothly and uniformly in the PBG fiber. FIG. 4D shows the part of the PBG fiber 200 filled with glass powder or glass fluid is heated by an fusion arc or a CO2 laser in making the filled-in glass fused with the PBG fiber to become one body. This will make the fiber loss of confinement and the mode field will be spread and enlarged. Especially, the air core part can be filled in shorter length than the surrounding holes to make the mode field spread to the cladding (in reducing the energy in the core) before they reach the glass part in the core the process control can be easily done by monitoring the fill in process under a microscope. Step 3 is to polish (with or without an angle) the end face of the fused portion. This portion can also be put in a ferrule for protection. With the end cap as described above, the mode field diameter is of the output light diameter is increased. The damage threshold is increased with an increased mode field diameter thus enables the laser system to generate an output beam with higher energy.

According to above descriptions and drawings, this invention discloses a method to increase an output pulse energy of a fiber CPA laser system. The method includes a step of implementing a photonics band gap (PBG) fiber to function as a compressor and increasing a mode area of the PBG fiber for absorbing greater amount of optical energy with an increased rate of heat dissipation. In a preferred embodiment, the step of increasing a mode area of the photonics band gap (PBG) fiber further including a step of splicing a fiber end cap with a core expander for increasing a mode area of the PBG fiber. In another preferred embodiment, the step of increasing a mode area of the photonics band gap (PBG) fiber further including a step of filling a silica into an end segment of a central air core and cladding air holes of the PBG fiber with the silica to function as an end cap to increase an mode area of the PBG fiber. In another preferred embodiment, the step of increasing a mode area of the photonics band gap (PBG) fiber further including a step of surround the PBG fiber with a ceramic ferrule/glass capillary and attaching a glass plate to an end surface of the ceramic ferrule/glass capillary to function as an end cap to increase an mode area of the PBG fiber. In another preferred embodiment, the step of attaching the glass plate further comprising attaching a flat glass plate substantially perpendicular to an optical path of the PBG fiber. In another preferred embodiment, the step of attaching the glass plate further includes a step of attaching a flat glass plate at a tilt angle relative to an optical path of the PBG fiber. In another preferred embodiment, the step of increasing a mode area of the photonics band gap (PBG) fiber further including a step of filling a glass powder into an end segment of a central air core and cladding air holes of the PBG fiber with the silica to function as an end cap to increase an mode area of the PBG fiber. In another preferred embodiment, the step of increasing a mode area of the photonics band gap (PBG) fiber further including a step of filling a liquid glass into an end segment of a central air core and cladding air holes of the PBG fiber with the silica to function as an end cap to increase an mode area of the PBG fiber.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A fiber-based pulse laser system, comprising:
   a laser amplification system configured to amplify an input laser pulse to produce an amplified laser pulse; and
   a fiber-based compressor configured to compress the amplified laser pulse to produce an compressed laser pulse, wherein the fiber-based compressor comprises an optical fiber that includes:
      a first end face configured to be optical coupled to the laser amplification system to allow the amplified laser pulse to enter the optical fiber;
      a second end face configured to allow the compressed laser pulse exits the optical fiber;
      an air core through the optical fiber, wherein the air core includes a first portion having a first opening at the first end face and a second portion having a second opening at the second end face, wherein the first portion is vacant, wherein the second portion is filled with a material comprising silicon; and
      a plurality of air holes substantially parallel to and surrounding the air core, wherein each of the plurality of air holes includes a third portion having a third opening at the first end face and a fourth portion having a fourth opening at the second end face, wherein the third portion is vacant, wherein the fourth portion is filled with the material comprising silicon, wherein the first portion in the air core is longer than the third portions in the air holes surrounding the air core.

2. The fiber-based pulse laser system of claim 1, wherein the second portion in the air core is shorter than the fourth portions in the air holes.

3. The fiber-based pulse laser system of claim 1, wherein the air core is aligned along a center axis of the optical fiber.

4. The fiber-based pulse laser system of claim 1, wherein the plurality of air holes are distributed in a substantially periodic pattern surrounding the air core.

5. The fiber-based pulse laser system of claim 1, wherein the material comprising silicon comprises glass.

6. The fiber-based pulse laser system of claim 1, wherein the material comprising silicon comprises a glass powder or a glass fluid.

7. The fiber-based pulse laser system of claim 1, wherein the optical fiber comprises a substrate, wherein the material comprising silicon in the second portion of the air core and in the third portions of the plurality of air holes is fused with the substrate of the optical fiber.

8. The fiber-based pulse laser system of claim 7, wherein the material comprising silicon and fused with the substrate of the optical fiber is configured to expand a spatial cross section of the compressed laser pulse as the compressed laser pulse propagates in the optical fiber toward the second end face of the optical fiber.

9. The fiber-based pulse laser system of claim 1, wherein the second end face is polished.

10. The fiber-based pulse laser system of claim 1, wherein the second end face is at an oblique angle relative to a center axis of the optical fiber.

11. The fiber-based pulse laser system of claim 1, wherein the second end face is substantially orthogonal to the center axis of the optical fiber.

12. A fiber-based pulse laser system, comprising:
   a laser amplification system configured to amplify an input laser pulse to produce an amplified laser pulse; and
   a fiber-based compressor configured to compress the amplified laser pulse to produce an compressed laser pulse, wherein the fiber-based compressor comprises an optical fiber that includes:
      a fiber-shaped substrate;
      a first end face configured to be optical coupled to the laser amplification system to allow the amplified laser pulse to enter the optical fiber;
      a second end face configured to allow the compressed laser pulse exits the optical fiber;
      an air core aligned along a center axis of the optical fiber and through the fiber-shaped substrate, wherein the air core includes a first portion having a first opening at the first end face and a second portion having a second opening at the second end face, wherein the first portion is vacant, wherein the second portion is filled with a material comprising silicon; and
      a plurality of air holes substantially parallel to and surrounding the air core, wherein each of the plurality of air holes includes a third portion having a third opening at the first end face and a fourth portion having a fourth opening at the second end face, wherein the third portion is vacant, wherein the fourth portion is filled with the material comprising silicon, wherein the first portion in the air core is longer than the third portions in the air holes surrounding the air core, wherein the second portion in the air core is shorter than the fourth portions in the air holes, wherein the material comprising silicon in the second portion of the air core and in the third portions of the plurality of air holes are fused with the fiber-shaped substrate.

13. The fiber-based pulse laser system of claim 12, wherein the material comprising silicon and fused with the substrate of the fiber-shaped substrate is configured to expand a spatial cross section of the compressed laser pulse as the compressed laser pulse propagates in the optical fiber toward the second end face of the optical fiber.

14. The fiber-based pulse laser system of claim 12, wherein the plurality of air holes are distributed in a substantially periodic pattern surrounding the air core.

15. The fiber-based pulse laser system of claim 12, wherein the material comprising silicon comprises glass.

16. The fiber-based pulse laser system of claim 12, wherein the material comprising silicon comprises a glass powder or a glass fluid.

17. The fiber-based pulse laser system of claim 12, wherein the second end face is polished.

18. The fiber-based pulse laser system of claim 12, wherein the second end face is at an oblique angle relative to the center axis of the optical fiber.

19. The fiber-based pulse laser system of claim 12, wherein the second end face is substantially orthogonal to the center axis of the optical fiber.

20. A fiber-based pulse laser system, comprising:
a laser amplification system configured to amplify an input laser pulse to produce an amplified laser pulse; and
a fiber-based compressor configured to compress the amplified laser pulse to produce a compressed laser pulse, wherein the fiber-based compressor comprises an optical fiber that includes:
a fiber-shaped substrate having a fiber length;
a first end face configured to be optical coupled to the laser amplification system to allow the amplified laser pulse to enter the optical fiber;
a second end face configured to allow the compressed laser pulse exits the optical fiber;
an air core aligned along a center axis of the optical fiber and having a first opening at the first end face, wherein the air core is shorter than the fiber length; and
a plurality of air holes substantially parallel to and surrounding the air core, wherein each of the plurality of air holes has a second opening at the first end face, wherein the plurality of air holes are shorter than the air core.

21. The fiber-based pulse laser system of claim 20, wherein the second end face is polished.

22. The fiber-based pulse laser system of claim 20, wherein the second end face is at an oblique angle relative to the center axis of the optical fiber.

23. The fiber-based pulse laser system of claim 20, wherein the second end face is substantially orthogonal to the center axis of the optical fiber.

24. The fiber-based pulse laser system of claim 20, wherein the air core and the plurality of air holes are vacant.

25. A fiber-based pulse laser system, comprising:
a laser amplification system configured to amplify an input laser pulse to produce an amplified laser pulse; and
a fiber-based compressor configured to compress the amplified laser pulse to produce an compressed laser pulse, wherein the fiber-based compressor comprises:
a first end face configured to be optical coupled to the laser amplification system to allow the amplified laser pulse to enter the optical fiber;
a first fiber portion, comprising:
an air core aligned along a center axis of the optical fiber and having a first opening at the first end face, wherein the air core is shorter than the fiber length; and
a plurality of air holes substantially parallel to and surrounding the air core, wherein each of the plurality of air holes has a second opening at the first end face, wherein the plurality of air holes are shorter than the air core;
a second fiber portion in connection with the first fiber portion, wherein the second fiber portion is configured to expand a spatial cross section of the compressed laser pulse as the compressed laser pulse propagates in the optical fiber toward the second end face of the optical fiber; and
a second end face at an end of the second fiber portion, the second end face configured to allow the compressed laser pulse exits the optical fiber.

26. The fiber-based pulse laser system of claim 25, wherein the second fiber portion does not comprise air core and air holes.

27. The fiber-based pulse laser system of claim 25, wherein the air core and the plurality of air holes are vacant.

28. The fiber-based pulse laser system of claim 25, wherein the second fiber portion comprises a material comprising silicon.

29. The fiber-based pulse laser system of claim 25, wherein the second end face is polished.

30. The fiber-based pulse laser system of claim 25, wherein the second end face is at an oblique angle relative to the center axis of the optical fiber.

31. The fiber-based pulse laser system of claim 25, wherein the second end face is substantially orthogonal to the center axis of the optical fiber.

* * * * *